US009952722B2

(12) United States Patent
Chang

(10) Patent No.: US 9,952,722 B2
(45) Date of Patent: Apr. 24, 2018

(54) TRANSMITTER AND TRANSMITTING METHOD THEREOF

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 37 days.

(21) Appl. No.: 14/537,300

(22) Filed: Nov. 10, 2014

(65) Prior Publication Data

US 2015/0130758 A1 May 14, 2015

Related U.S. Application Data

(60) Provisional application No. 61/902,137, filed on Nov. 8, 2013.

(30) Foreign Application Priority Data

Dec. 31, 2013 (TW) .............................. 102149230 A

(51) Int. Cl.
*G06F 3/044* (2006.01)
*G06F 3/0354* (2013.01)
*G06F 3/038* (2013.01)
*G06F 3/041* (2006.01)

(52) U.S. Cl.
CPC .......... *G06F 3/044* (2013.01); *G06F 3/03545* (2013.01); *G06F 3/0418* (2013.01)

(58) Field of Classification Search
CPC .... G06F 3/0418; G06F 3/0383; G06F 3/0416; G06F 3/044; G06F 3/03543; G06F 3/03545; G06F 3/0354; G06F 2203/0382; G06F 2203/04104
See application file for complete search history.

(56) References Cited

U.S. PATENT DOCUMENTS

| 9,218,070 | B2 | 12/2015 | Oda et al. | |
| 2012/0000717 | A1* | 1/2012 | Hauck | G06F 3/03545 178/19.01 |
| 2012/0043973 | A1* | 2/2012 | Kremin | G06F 3/044 324/658 |
| 2012/0056841 | A1* | 3/2012 | Krenik | G06F 3/044 345/174 |
| 2012/0256830 | A1 | 10/2012 | Oda et al. | |
| 2013/0207938 | A1* | 8/2013 | Ryshtun | G06F 3/0416 345/179 |
| 2013/0249823 | A1 | 9/2013 | Ahn et al. | |

(Continued)

FOREIGN PATENT DOCUMENTS

CN 1877489 A 12/2006
CN 101145087 A 3/2008

(Continued)

*Primary Examiner* — Bryan Earles
(74) *Attorney, Agent, or Firm* — WPAT, PC

(57) ABSTRACT

The present invention provides a transmitter which is configured to transmit an electrical signal to a capacitive touch sensitive device according to a transmitter status in response to a trigger event detected. As a result, the capacitive touch sensitive device can calculate the transmitter status and a relative position between the transmitter and the capacitive touch sensitive device. The electrical signal is mixed by signals having a plurality of frequencies.

30 Claims, 12 Drawing Sheets

(56) References Cited

U.S. PATENT DOCUMENTS

| | | | | |
|---|---|---|---|---|
| 2014/0028577 A1* | 1/2014 | Krah | ............... | G06F 3/0416 345/173 |
| 2014/0049478 A1* | 2/2014 | Brunet | ............... | G06F 3/0416 345/173 |
| 2014/0104187 A1* | 4/2014 | Bakken | ............... | G06F 3/044 345/173 |
| 2014/0160088 A1* | 6/2014 | Mercea | ............... | G06F 1/3259 345/179 |
| 2014/0168116 A1* | 6/2014 | Sasselli | ............... | G06F 3/0416 345/173 |
| 2014/0176495 A1* | 6/2014 | Vlasov | ............... | G06F 3/044 345/174 |
| 2017/0123518 A1 | 5/2017 | Ahn et al. | | |

FOREIGN PATENT DOCUMENTS

| | | |
|---|---|---|
| CN | 102109923 A | 6/2011 |
| CN | 102693018 | 9/2012 |
| KR | 101282430 | 7/2013 |

\* cited by examiner

TRANSMITTER AND TRANSMITTING METHOD THEREOF

BACKGROUND OF THE INVENTION

1. Field of the Invention

The present invention relates to transmitters applicable to touch sensitive panels, and more particularly, to transmitters with power saving capacity.

2. Description of the Prior Art

Touch sensitive panels or screens are important human-machine interfaces, especially on consumer electronic products like portable phones, tablet PCs, or Personal Digital Assistances (PDAs). Touch sensitive screens are one of the main input/output (I/O) devices. Since capacitive touch sensitive screens, especially those of projected capacitive types, are very sensitive to finger touches, it has become one of the main design choices for touch sensitive panels/screens on the market. Touching the screen with the tip of a finger will inevitably block part of the screen, such that the user cannot confirm a point that is being detected by the touch sensitive with his/her eyes. In addition, one cannot have as accurate control as using a pen (or stylus) when using their finger tip(s) to write. Therefore, in addition to using the finger tips to touch the screen, the user may also wish to use a stylus for input to the screen.

As the power supply of an active stylus, i.e. one that transmits signals actively, comes from the batteries, in order to reduce the power consumption and increase the life of the batteries, there is a need for a stylus with an automatic power saving feature and a touch sensitive device that accommodates such a stylus.

SUMMARY OF THE INVENTION

In an embodiment, the present invention provides a transmitter for transmitting an electrical signal to a capacitive touch sensitive device according to a transmitter status in response to a trigger event detected, allowing the capacitive touch sensitive device to analyze the electrical signal in order to obtain the transmitter status and a relative position between the transmitter and the capacitive touch sensitive device, wherein the electrical signal is mixed by signals having a plurality of frequencies.

In another embodiment, the present invention provides a transmitting method applicable to a transmitter, which may include the steps of: detecting a trigger event; transmitting an electrical signal to a capacitive touch sensitive device according to a transmitter status in response to the trigger event detected, allowing the capacitive touch sensitive device to analyze the electrical signal in order to obtain the transmitter status and a relative position between the transmitter and the capacitive touch sensitive device, wherein the electrical signal is mixed by signals having a plurality of frequencies.

In still another embodiment, the present invention provides a touch sensitive system, which may include a transmitter and a capacitive touch sensitive device. The transmitter is used for transmitting an electrical signal to according to a transmitter status in response to a trigger event detected, wherein the electrical signal is mixed by signals having a plurality of frequencies. The capacitive touch sensitive device is used for analyzing the electrical signal in order to obtain the transmitter status and a relative position between the transmitter and the capacitive touch sensitive device.

In some embodiments, the present invention provides a touch processing device connected to a touch sensitive panel, which may include plurality of first electrodes and a plurality of second electrodes, wherein a plurality of sensing points are formed at intersections of the first and second electrodes, wherein the touch processing device is used for allowing at least some of the plurality of first electrodes to transmit an activation signal at an activation frequency in a first period, wherein the activation signal enables a transmitter to transmit an electrical signal, and for allowing the plurality of first and second electrodes to receive the electrical signal in a second period, so as to analyze the electrical signal to obtain a transmitter status of the transmitter and a relative position between the transmitter and the touch sensitive panel.

In some embodiments, the present invention provides a touch processing method applicable to a touch processing device connected to a touch sensitive panel, wherein the touch sensitive panel includes a plurality of first electrodes and a plurality of second electrodes, wherein a plurality of sensing points are formed at intersections of the first and second electrodes. The touch processing method may include the following steps of: allowing at least some of the plurality of first electrodes to transmit an activation signal at an activation frequency in a first period, wherein the activation signal enables a transmitter to transmit an electrical signal; and allowing the plurality of first and second electrodes to receive the electrical signal in a second period, so as to analyze the electrical signal to obtain a transmitter status of the transmitter and a relative position between the transmitter and the touch sensitive panel.

In summary of the above, one of the main principles of the present invention lies in that the transmitter generates a transmitter status according to a status in the sensor module within a period of time since a trigger event is detected, and transmits an electrical signal to a touch sensitive device according to the transmitter status. After this period of time, the transmitter can enter into a power-saving mode, and only periodically activates part of the circuits to detect any trigger events while allowing the rest to remain in the power-saving mode.

DETAILED DESCRIPTION OF THE PREFERRED EMBODIMENTS

Figure 1:
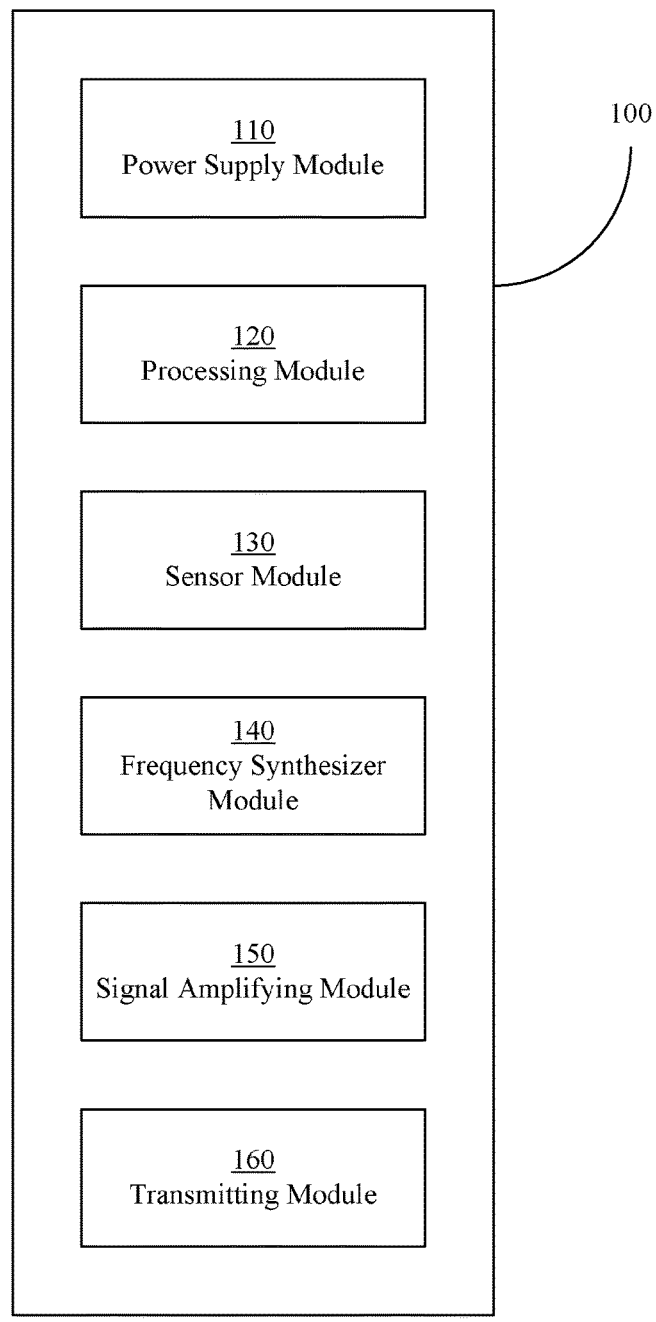
FIG. 1 is a schematic diagram illustrating a transmitter in accordance with an embodiment of the present invention.

The present invention is described in details with reference to some embodiments below. However, in addition to the disclosed embodiments, the scope of the present invention is not limited by these embodiments, rather by the scope of the claims. Moreover, in order for one with ordinary skills in the art to have a better understanding and clarity of the descriptions, some components in the drawings may not necessary be drawn to scale, in which some may be exaggerated relative to others, and irrelevant parts are omitted.

In an embodiment, the transmitter mentioned in the present invention may be a stylus. In some embodiments, the transmitter may be other types of objects that can be placed on a touch sensitive panel or screen. For example, when the touch sensitive screen displays a chessboard, the transmitter may be the chess. Once the game program detects the location of the chess on the touch sensitive screen, it will know the location of the chess.

Regardless of how much contact area there is between the transmitter and the touch sensitive panel and how many touch points there are, the transmitter at least includes a transmitting anchor point. The touch sensitive panel or screen may detect the location of the transmitting anchor point as the representative location of an object represented by the transmitter on the touch sensitive panel or screen. In an embodiment, the transmitter does not need to come into contact with the touch sensitive panel, only the transmitting anchor point needs to be in proximity to the touch sensitive panel for the touch sensitive panel to detect the transmitting anchor point.

In an embodiment, the transmitter may include a plurality of transmitting anchor points. When the touch sensitive panel detects a plurality of transmitting anchor points, it is able to detect the facing direction of the transmitter. In another embodiment, the transmitter may include m transmitting anchor points, and when the touch sensitive panel detects n of the transmitting anchor points, it is able to detect the stance of the transmitter on the touch sensitive panel. For example, the transmitter is a triangular body with four transmitting anchor points; each transmitting anchor point is positioned at one vertex of the triangular body, by detecting three transmitting anchor points on the touch sensitive panel, the touch sensitive panel will be able to know which face of the triangular body is in contact with it. The transmitter may also be a square body with eight transmitting anchor points, where each transmitting anchor point is positioned at a vertex of the square body. This type of transmitter can be used as a dice.

Referring to FIG. 1, a schematic diagram illustrating a transmitter 100 in accordance with an embodiment of the present invention is shown. The transmitter 100 includes a power supply module 110, a processing module 120, a sensor module 130, a frequency synthesizer module 140, a signal amplifying module 150 and a transmitting module 160. As mentioned above, the transmitter 100 may assume the shape of a stylus. In an embodiment, the above modules may be arranged inside the stylus according to the order shown in FIG. 1, the bottom of the stylus is to be in contact with or proximity to a touch sensitive panel. The transmitter 100 may include a master switch for turning on/off the power of the transmitter 100.

The power supply module 110 may include circuits associated with power supply and control, such as a battery pack, a DC-to-DC voltage converter, a power management unit and the like. The battery pack can be rechargeable batteries or disposable batteries. When the battery pack includes rechargeable batteries, the power supply module 110 may further include a charger circuit for inputting an external power into the rechargeable batteries. In an embodiment, the charger circuit can be included in the power management unit for protecting the rechargeable batteries from over discharging and over charging.

The above processing module 120 is used for controlling the transmitter 100, and may include a microprocessor. The above sensor module 130 may include at least one sensor. The sensor may, for example, include a pressure sensor at the tip of the stylus, a button, an accelerometer, an inductance meter, a knob, or the like. The status of the sensor may be in binary form. For example, the button may be in either a pressed-down status or a released status. The statuses of an accelerometer may include stationary and in motion. The statuses of the sensor may include n-ary discrete values. For example, the pressure experienced by the pressure sensor may be divided into four levels, ten levels, or sixteen levels. The statuses of the knob may also be in four levels, ten levels, or sixteen levels. The status of the sensor can also be an analog interval. The above processing module 120 is able to detect the status of the sensor in the sensor module 130, and generate a transmitter status accordingly.

The above frequency synthesizer module 140 includes a plurality of frequency generators and a frequency synthesizer or mixer. In one embodiment, the above plurality of frequency generators may include a plurality of quartz oscillators. In another embodiment, the above frequency generators can use a single frequency source, and generate a plurality of frequencies through the use of dividers, frequency multipliers, phase lock circuits and other appropriate circuitries. These frequencies are not mutually resonant frequency waves, and different from and not mutually resonant with the frequency emitted by the touch sensitive panel for detecting the transmitter 100. This avoids interference between the various frequencies.

In some embodiments, the ranges of the plurality of frequencies fall within the detectable frequency range of the touch sensitive panel. For example, a frequency range that generally can be detected by a touch sensitive panel is approximately between 90 kHz and 250 kHz, so the frequencies generated by the plurality of frequency generators may fall within this range.

In an embodiment, the above processing module 120 may decide which frequencies in the plurality of frequencies are to be synthesized by the frequency synthesizer module 140.

In other words, a specific frequency can be controlled not to be added to the mixer. Of course, the signal strength of an individual frequency may also be controlled. In another embodiment, the above processing module 120 may decide the ratios of the signal strengths of the various frequencies for the frequency synthesizer module 140. For example, the ratio of the signal strength of a first frequency to that of a second frequency may be 3:7. As another example, the ratio of the signal strengths between a first, a second and a third frequency may be 24:47:29. One with ordinary skills in the art can appreciate that although the frequency synthesizer module 140 can be used for generating and mixing multiple frequencies, the processing module 120 may also instruct the frequency synthesizer module 140 to generate a single frequency without mixing with any other frequencies based on the statuses of the sensors in the sensor module 130.

In an embodiment, the signal strength of a particular frequency may correspond to a pressure sensor at the tip of the stylus or a knob with multiple levels in the sensor module 130. For example, in a graphics software, the pressure sensor at the tip of a stylus may indicate the shades of the color, and the degree of rotation of the knob may indicate the diameter of the brush. Thus, the signal strength of a first frequency can be used to indicate the pressure on the pressure sensor, and the signal strength of a second frequency can be used to indicate the degree of rotation of the knob.

In another embodiment, the proportion of the signal strength of one frequency among the signal strength of the mixed frequencies can be used to correspond to one of the n-ary statuses of a sensor. For example, when the ratio of the signal strengths of a first frequency to a second frequency is 3:7, it indicates the status of the sensor is in the third level among ten levels. If the ratio of the strengths is changed to 6:4, this indicates the status of the sensor is in the sixth level among ten levels. In other words, if there are three frequencies, then the ratio of the signal strengths of a first frequency to a second frequency, the ratio of the signal strengths of the second frequency to a third frequency, and the ratio of the signal strengths of the third frequency to the first frequency can be used to indicate three statuses of the n-ary sensor, respectively.

The above signal amplifying module 150 is used for amplifying the signal mixed by the frequency synthesizer module 140. In an embodiment, the above signal amplification corresponds to the pressure sensor in the sensor module 130 at the tip of the stylus. If the circuit of the pressure sensor corresponds to a variable gain amplifier (VGA) of the signal amplifying module 150, the circuit of the pressure sensor may directly control the gain of the VGA without going through the processing module 120. Therefore, the mixed signal outputted by the frequency synthesizer module 140 can be amplified by the VGA and sent to the transmitting module 160.

As mentioned before, the signal strength of a particular frequency in the mixed signal can be used to indicate a status of an n-ary sensor. The ratio of the signal strengths of two frequencies in the mixed can also be used to indicate a status of another n-ary sensor. Meanwhile, the signal amplifying module 150 can be use to amplify the mixed signal to indicate the status of yet another n-ary sensor. For example, the transmitter 100 includes two n-ary sensors: one is a pressure sensor provided at the tip of the stylus, and the second one is a knob provided on the body of the stylus, they are used to indicate the color shade and the diameter of the stylus, respectively. In an embodiment, the strength of the mixed signal can be used to indicate the degree of pressure experienced by the pressure sensor. The status of the knob can be indicated by the ratio of the signal strengths of two frequencies in the mixed signal.

In an embodiment of the present invention, the transmitting module 160 includes a pressure sensor provided at the tip of the stylus. The transmitting module 160 can be an array of antennas or a conductor or an electrode with the appropriate impedance value, which can also be called an excitation electrode. The conductor or electrode at the tip of the stylus is connected to the pressure sensor. When the transmitting module 160 emits a signal and touches the touch sensitive panel/screen, the signal will flow into the sensing electrodes of the touch sensitive panel/screen. When the transmitting module 160 is near but not in contact with the touch sensitive panel/screen, the sensing electrodes of the touch sensitive panel/screen may still experience the signal variations on the transmitting module 160, thereby allowing the touch sensitive/panel to detect the approaching of the transmitter 100.

When the frequency synthesizer module 140 synthesizes n frequencies, the frequencies of the signal can be used to modulate $2^n$ statues. For example, when n equals to three, the frequencies of the signal can be used to modulate eight statues. Referring to Table 1, the transmitter statuses and their corresponding statuses of the sensors are shown.

TABLE 1

|  | Pressure Sensor | First Button | Second Button |
|---|---|---|---|
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Fifth Transmitter Status | No Contact Pressure | Released | Released |
| Sixth Transmitter Status | No Contact Pressure | Pressed | Released |
| Seventh Transmitter Status | No Contact Pressure | Pressed | Pressed |
| Eighth Transmitter Status | No Contact Pressure | Released | Pressed |

In the embodiment shown by Table 1, the sensor module 130 includes three sensors: a pressure sensor at the tip of the stylus, a first button and a second button. The status of these three sensors are all in binary forms, so there are eight different combinations of transmitter statuses in total, as shown in Table 1. One with ordinary skills in the art can appreciate that the correspondence between the transmitter statuses and the sensors' statuses can be arbitrarily changed. For example, the first transmitter status can swap with another transmitter status, for example, the seventh transmitter status.

Referring to Table 2, the transmitter statuses and their corresponding frequency mixings are shown. As described before, the frequency synthesizer module 140 may synthesize three different frequencies, so each transmitter status may correspond to a different combination of the frequencies as shown in Table 2. One with ordinary skills in the art can appreciate that the correspondence between the transmitter statuses and the combinations of frequencies can be arbitrarily changed. For example, the first transmitter status can swap with another transmitter status, for example, the eighth transmitter status.

TABLE 2

|  | First Frequency | Second Frequency | Third Frequency |
|---|---|---|---|
| First Transmitter Status | Mixed | Mixed | Mixed |
| Second Transmitter Status | Mixed | Mixed | Not Mixed |
| Third Transmitter Status | Mixed | Not Mixed | Not Mixed |
| Fourth Transmitter Status | Mixed | Not Mixed | Mixed |
| Fifth Transmitter Status | Not Mixed | Mixed | Mixed |
| Sixth Transmitter Status | Not Mixed | Mixed | Not Mixed |
| Seventh Transmitter Status | Not Mixed | Not Mixed | Not Mixed |
| Eighth Transmitter Status | Not Mixed | Not Mixed | Mixed |

In an embodiment, when the pressure sensor at the tip of the stylus is not under any pressure, the transmitter 100 still mixes the frequencies and sends out a signal. In another embodiment, when the pressure sensor at the tip of the stylus is not under any pressure, the transmitter 100 does not mix the frequencies and transmit any signal. With respect to Table 2, this status is the seventh transmitter status. In this embodiment, Table 1 can be altered into Table 3.

TABLE 3

|  | Pressure Sensor | First Button | Second Button |
|---|---|---|---|
| First Transmitter Status | Contact Pressure | Released | Released |
| Second Transmitter Status | Contact Pressure | Pressed | Released |
| Third Transmitter Status | Contact Pressure | Pressed | Pressed |
| Fourth Transmitter Status | Contact Pressure | Released | Pressed |
| Seventh Transmitter Status | No Contact Pressure | Released | Released |
| Seventh Transmitter Status | No Contact Pressure | Pressed | Released |
| Seventh Transmitter Status | No Contact Pressure | Pressed | Pressed |
| Seventh Transmitter Status | No Contact Pressure | Released | Pressed |

In the embodiments shown in Table 1 to Table 3, the transmitter 100 uses the synthesizing of the frequencies as the only factor of signal modulation. In the following embodiments, in addition to frequency synthesizing, signal strength and/or ratio of signal strengths of different frequencies are included as the factors of signal modulation.

Referring to Table. 4, transmitter frequency statuses and their corresponding sensors' statuses in accordance with an embodiment of the present invention are shown. Compared to the embodiment shown in Table 1, the statues sensed by the pressure sensor are not limited to two statuses (i.e. contact pressure/no contact pressure), but more than two statuses. Thus, the left column of Table 4 is not called transmitter status anymore, but rather transmitter frequency status. The modulation factors of the transmitter status of this embodiment include, in addition to the frequency status, the signal strength as well.

TABLE 4

|  | Pressure Sensor | First Button | Second Button |
|---|---|---|---|
| First Transmitter Frequency Status | Contact Pressure Level >0 | Released | Released |
| Second Transmitter Frequency Status | Contact Pressure Level >0 | Pressed | Released |
| Third Transmitter Frequency Status | Contact Pressure Level >0 | Pressed | Pressed |
| Fourth Transmitter Frequency Status | Contact Pressure Level >0 | Released | Pressed |
| Fifth Transmitter Frequency Status | Contact Pressure Level = 0 | Released | Released |
| Sixth Transmitter Frequency Status | Contact Pressure Level = 0 | Pressed | Released |
| Seventh Transmitter Frequency Status | Contact Pressure Level = 0 | Pressed | Pressed |
| Eighth Transmitter Frequency Status | Contact Pressure Level = 0 | Released | Pressed |

Referring to Table 5, transmitter statuses and their corresponding frequency mixings and signal strengths in accordance with an embodiment of the present invention are shown. The signal strength modulation can be the signal strength value of the mixed signal to indicate, for example, the contact pressure level of the pressure sensor.

TABLE 5

|  | First Frequency | Second Frequency | Third Frequency |
|---|---|---|---|
| First Transmitter Frequency Status + Signal Strength Modulation | Mixed | Mixed | Mixed |
| Second Transmitter Frequency Status + Signal Strength Modulation | Mixed | Mixed | Not Mixed |
| Third Transmitter Frequency Status + Signal Strength Modulation | Mixed | Not Mixed | Not Mixed |
| Fourth Transmitter Frequency Status + Signal Strength Modulation | Mixed | Not Mixed | Mixed |
| Fifth Transmitter Frequency Status + Signal Strength Modulation | Not Mixed | Mixed | Mixed |
| Sixth Transmitter Frequency Status + Signal Strength Modulation | Not Mixed | Mixed | Not Mixed |
| Seventh Transmitter Frequency Status + Signal Strength Modulation | Not Mixed | Not Mixed | Not Mixed |
| Eighth Transmitter Frequency Status + Signal Strength Modulation | Not Mixed | Not Mixed | Mixed |

In the embodiment of Table 5, the contact pressure levels of the pressure sensor corresponding to the fifth to the eighth transmitter frequency statues are all zero, so the results of signal strength modulation can also be zero. In other words, no signal is transmitted. In another embodiment, such a signal strength modulation can be a constant. This constant signal strength can be different from the signal strengths corresponding to other contact pressure levels of the pressure sensor.

Figure 2:
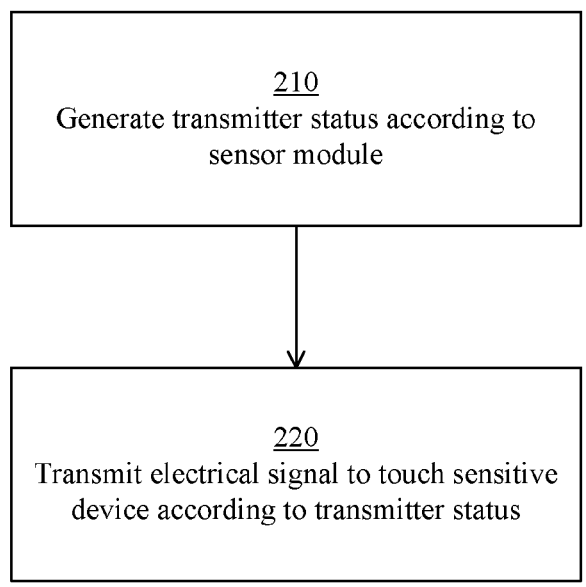
FIG. 2 is a flowchart illustrating a transmitting method in accordance with an embodiment of the present invention.

Referring to FIG. 2, a flowchart illustrating a transmitting method in accordance with an embodiment of the present invention is shown. The transmitting method is applicable to the transmitter 100 shown in FIG. 1, but not limited thereto. The transmitting method includes two steps. In step 210, a transmitter status is generated based on a status inside a sensor module included in the transmitter. In step 220, an electrical signal is transmitted to a touch sensitive device according to the transmitter status, so that after analyzing the electrical signal, the touch sensitive device is able to find out the transmitter status and a relative position of the transmitter with respect to the touch sensitive device. The electrical signal is mixed from a plurality of signals having different frequencies.

In an embodiment, a sensor inside the sensor module includes one of the following: a button, a knob, a pressure sensor (or a pressure gauge), an accelerometer or a gyroscope. The pressure sensor can be used to sense the contact pressure level between the transmitter and the touch sensitive device.

When the sensor module includes a plurality of sensors, the number of possible statues of the transmitter status is the sum of the number of possible statues of every sensor. Alternatively, in another embodiment, the transmitter status indication is one of arbitrary combinations of every sensor's status indication. In an embodiment, the status indication of a sensor inside the sensor module is the nth power of two, wherein n is an integer greater than or equal to 0.

The modulation factor of the electrical signal includes one or a combination of: frequency and strength. In an embodiment, the signal strength of the electrical signal corresponds to a status of an n-ary sensor in the sensor module. In another embodiment, the signal strengths of a first frequency and a second frequency mixed in the electrical signal correspond to a status of an n-ary sensor in the sensor module. In yet another embodiment, the signal strength of the electrical signal corresponds to a status of a first n-ary sensor in the sensor module, wherein the ratio of the signal strengths of a first frequency to a second frequency mixed in the electrical signal corresponds to a status of a second n-ary sensor in the sensor module.

One main principle of the present invention lies in the use of an electrical signal mixed from a plurality of frequencies, so that a touch sensitive device may be able to detect the position of a transmitter transmitting the electrical signal and the status of at least one sensor on the transmitter.

Figure 3:
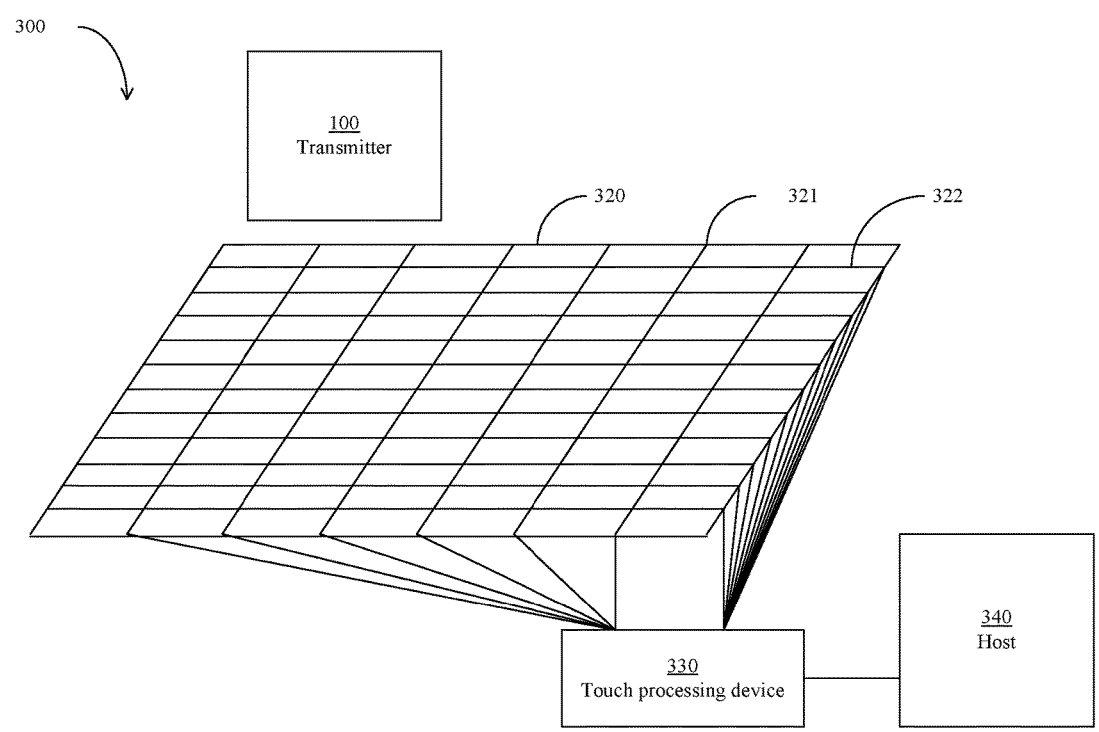
FIG. 3 is a schematic diagram depicting a touch sensitive system in accordance with an embodiment of the present invention.

Referring now to FIG. 3, a schematic diagram depicting a touch sensitive system 300 in accordance with an embodiment of the present invention is shown. The touch sensitive system 300 includes at least one transmitter 100, a touch sensitive panel 320, a touch processing device 330 and a host 340. In this embodiment, the transmitter 100 is applicable to the transmitters described in the previous embodiments, especially the embodiments shown in FIGS. 1 and 2. It should also be noted that the touch sensitive system 300 may include a plurality of transmitters 100. The touch sensitive panel 320 is formed on a substrate. The touch sensitive panel 320 can be a touch sensitive screen, but the present invention does not restrict the form of the touch sensitive panel 320.

In an embodiment, a touch sensitive area of the touch sensitive panel 320 includes a plurality of first electrodes 321 and a plurality of second electrodes 322. A plurality of sensing points are formed at the intersections of these two electrodes. These first electrodes 321 and second electrodes 322 are connected to the touch processing device 330. Under mutual capacitive sensing, the first electrodes 321 can be called first conductive strips or driving electrodes and the second electrodes 322 can be called second conductive strips or sensing electrodes. The touch processing device 330 is able to know the approach or touch (approach/touch) of any external conductive object on the touch sensitive panel 320 by first providing a driving voltage to the first electrodes 321 and then measuring the signal variations of the second electrodes 322. One with ordinary skills in the art can appreciate that the touch processing device 330 may use mutual- or self-capacitive sensing methods to detect an approaching/touching event or object, and they will not be further described. In addition to mutual- or self-capacitive sensing methods, the touch processing device 330 may also detect the electrical signal emitted by the transmitter 100 in order to detect the relative position of the transmitter 100 with respect to the touch sensitive panel 320. The detection principle will be detailed in the later sections of the specification.

FIG. 3 further includes a host 340, which can be an operating system such as a CPU or a main processor in an embedded system, or other types of computers. In an embodiment, the touch sensitive system 300 can be a table PC. The host 340 can be a CPU for executing the operating programs of the table PC. For example, the table PC executes an Android operating system, and the host 340 is an ARM processor executing the Android operating system. The present invention does not limit the form of information transmission between the host 340 and the touch processing device 330 as long as the information transmitted is relevant to the approaching/touching event(s) happened on the touch sensitive panel 320.

Figure 4:
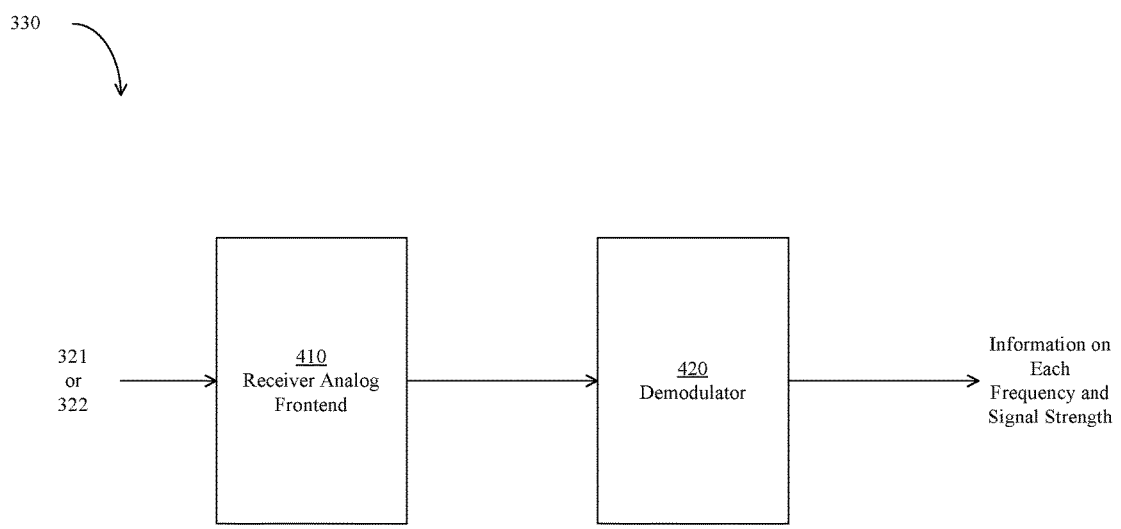
FIG. 4 is a block diagram depicting a portion of the touch processing device in accordance with an embodiment of the present invention.

Referring to FIG. 4, a block diagram depicting a portion of the touch processing device 330 in accordance with an embodiment of the present invention is shown. As mentioned earlier, the touch processing device 330 may use mutual- or self-capacitive sensing principle to detect an approaching/touching event, so details related to capacitive sensing will not be described hereinafter. The embodiment shown in FIG. 4 includes a receiver analog front end 410 and a demodulator 420.

The receiver analog front end 410 is connected to the first electrodes 321 or the second electrodes 322 described before. In an embodiment, each of the first electrodes 321 and each of the second electrodes 322 are connected to a receiver analog front end 410, respectively. In another embodiment, a plurality of first electrodes 321 form a set, and a plurality of second electrodes 322 form a set, and each set of first electrodes 321 corresponds to a receiver analog front end 410, and each set of second electrodes 322 corresponds to another receiver analog front end 410. Each receiver analog front end 410 receives in turn the signal of the first electrodes 321 or second electrodes 322 in the set. In another embodiment, a set of first electrodes 321 and a set of second electrodes 322 correspond to one receiver analog front end 410. The receiver analog front end 410 can first be connected in turn to the first electrodes 321 in the set of the first electrodes 321, and then connected in turn to the second electrodes 322 in the set of the second electrodes 322. On the contrary, the receiver analog front end 410 can first be connected in turn to the second electrodes 322 in the set of the second electrodes 322, and then connected in turn to the first electrodes 321 in the set of the first electrodes 321. In an embodiment, the touch processing device 330 may include only one receiver analog front end 410. One with ordinary skills in the art can appreciate that the present invention does not limit how the first electrodes 321 or the second electrodes 322 are configured to the receiver analog front end 410. In other words, the number of receiver analog front ends 410 included in the touch processing device 330 may be smaller than or equal to the sum of the first electrodes 321 and the second electrodes 322.

The receiver analog front end 410 may perform some filtering, amplifying or other types of analog signal processing. In some embodiments, the receiver analog front end 410 can receive the difference between two adjacent first electrodes 321, or the difference between two adjacent second electrodes 322. In an embodiment, each receiver analog front end 410 can output to a demodulator 420. In another embodiment, every $n^{th}$ receiver analog front end 410 may output to a demodulator 420. In yet another embodiment, each receiver analog front end 410 may output to N demodulators 420, wherein N is a positive integer greater than or equal to one. In some embodiments, the touch processing device 330 may include only one demodulator 420. One with ordinary skills in the art can appreciate that the present invention does not limit how the receiver analog front end(s) 410 is/are configured to the demodulator(s) 420.

The demodulator 420 is used to demodulate the electrical signal transmitted by the transmitter 100 in order to obtain information on each frequency and information on the signal strengths in the received signals of the corresponding first electrodes 321 or second electrodes 322. For example, the transmitter 100 may transmit a signal having three frequencies. The demodulator 420 may obtain the signal strengths for these three frequencies, the ratio(s) of signal strengths of each two or arbitrary two frequencies, and the overall signal strength. In the present invention, the demodulator 420 can be implemented in a digital or analog way; it is described in the following three embodiments.

Figure 5:
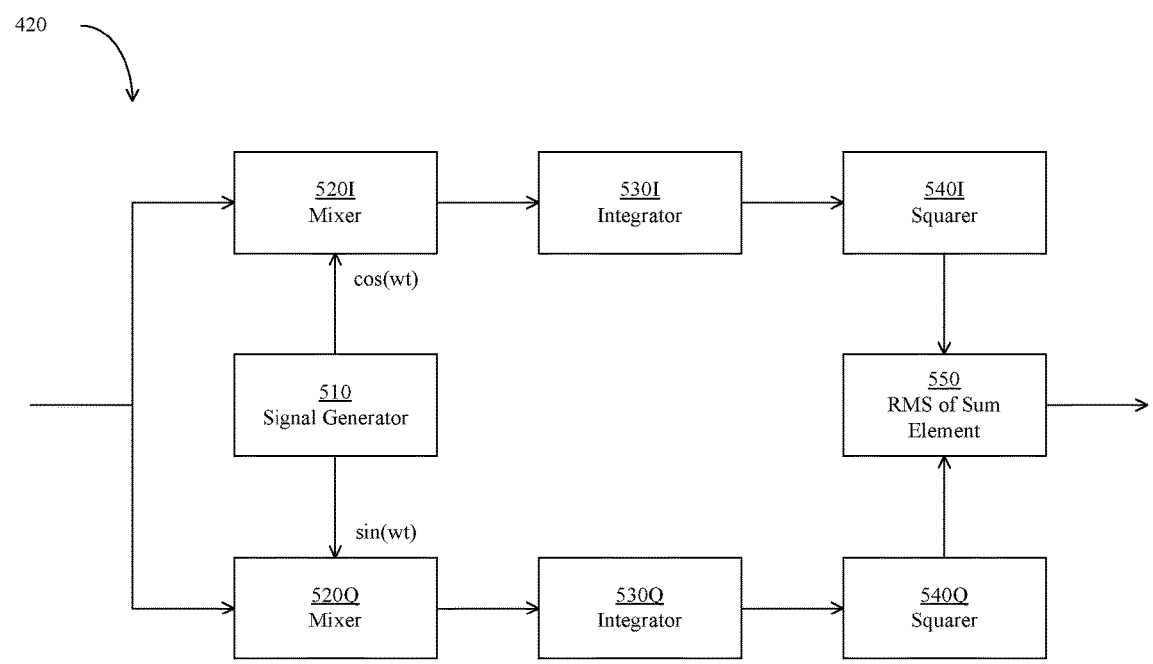
FIG. 5 is a block diagram depicting a portion of an analog demodulator in accordance with an embodiment of the present invention.

Referring to FIG. 5, a block diagram depicting a portion of an analog demodulator 420 in accordance with an embodiment of the present invention is shown. A single analog demodulator shown in FIG. 5 can be used to demodulate every frequency, or a plurality of analog demodulators shown in FIG. 5 can be used to demodulate a plurality of frequencies. For example, when the transmitter 100 transmits N frequencies, N of the analog demodulator shown in FIG. 5 are used to demodulate each of the frequencies. A signal generator 510 is used to generate signals of corresponding frequencies.

An analog signal received from the receiver analog front end 410 can be passed through an optional amplifier (not shown) and then to two mixers 520I and 520Q. The mixer 520I receives a cosine signal outputted by the signal generator 510, while the mixer 520Q receives a sine signal outputted by the signal generator 510. The mixer signals outputted by the mixers 520I and 520Q are then sent to integrators 530I and 530Q, respectively. Then, the integrated signals are sent to squarers 540I and 540Q by the integrators 530I and 530Q, respectively. Finally, the outputs of the squarers 540I and 540Q are summed and then root-mean-squared by a "Root Mean Square (RMS) of Sum" element. As such, the signal strengths corresponding to the signal frequencies generated by the signal generator 510 can be obtained. After the signal strengths of all frequencies are obtained, the ratio(s) of the signal strengths of each two or arbitrary two frequencies and the overall signal strength can then be generated.

Figure 6:
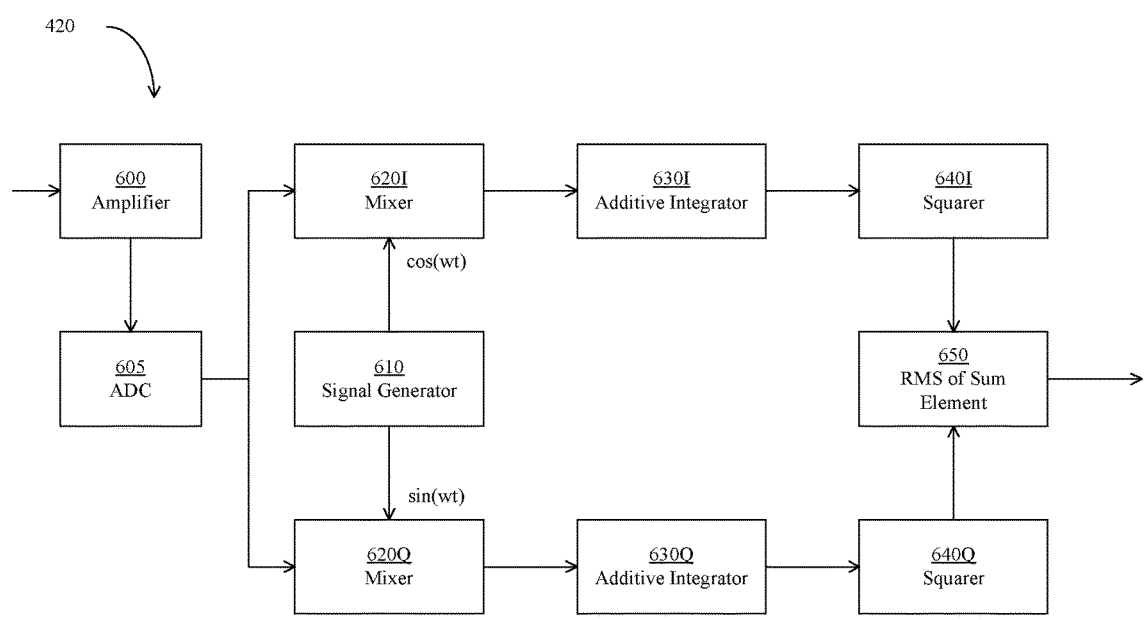
FIG. 6 is a block diagram depicting a portion of a digital demodulator in accordance with an embodiment of the present invention.

Referring to FIG. 6, a block diagram depicting a portion of a digital demodulator 420 in accordance with an embodiment of the present invention is shown. Compared to the embodiment shown in FIG. 5, the embodiment shown in FIG. 6 is carried out in a digital manner. Similarly, a single digital demodulator shown in FIG. 6 can be used to demodulate every frequency, or a plurality of the digital demodulators shown in FIG. 6 can be used to demodulate a plurality of frequencies. For example, when the transmitter 100 transmits N frequencies, N of the digital demodulator shown in FIG. 6 are used demodulate each of the frequencies. A signal generator 610 is used to generate digital signals of corresponding frequencies.

An analog signal received from the receiver analog front end 410 can be passed through an optional amplifier 600 and then to an analog-to-digital converter (ADC) 605. The sampling frequency of the ADC 605 will correspond to the frequency of the signal transmitted by the signal generator 610. In other words, when the ADC 605 is performing one sampling, the signal generator 610 will send out signals to two mixers 620I and 620Q once. The mixer 620I receives a cosine signal outputted by the signal generator 610, while the mixer 620Q receives a sine signal outputted by the signal generator 610. The mixer signals outputted by the mixers 620I and 620Q are then outputted to additive integrators 630I and 630Q, respectively. Then, the addition-integrated signals are sent to squarers 640I and 640Q by the additive integrators 630I and 630Q, respectively. Finally, the outputs of the squarers 640I and 640Q are summed and root-mean-squared by a "Root Mean Square (RMS) of Sum" element. As such, the signal strengths corresponding to the signal frequencies generated by the signal generator 610 can be obtained. After the signal strengths of all frequencies are obtained, the ratios of the signal strengths of each two frequencies and the overall signal strength can then be generated.

Figure 7:
FIG. 7 is a block diagram depicting a portion of a digital demodulator in accordance with an embodiment of the present invention.
Figure 7:
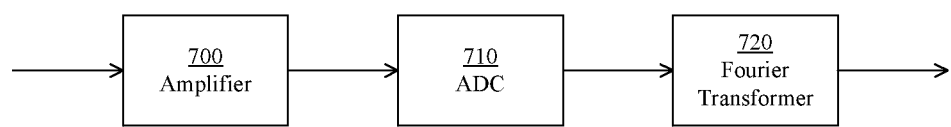

Referring to FIG. 7, a block diagram depicting a portion of a digital demodulator 420 in accordance with an embodiment of the present invention is shown. The embodiment shown in FIG. 7 is carried out in a digital manner, and a single digital demodulator shown in FIG. 7 can be used to demodulate every frequency. An analog signal received from the receiver analog front end 410 can be passed through an optional amplifier 700 and then to an analog-to-digital converter (ADC) 705. Then, the outputted digital signal is sent to a Fourier transformer 720 to demodulate the signal strength of each frequency on the frequency domain. The above Fourier transformer can be a digitalized Fast Fourier transformer.

Figure 8:
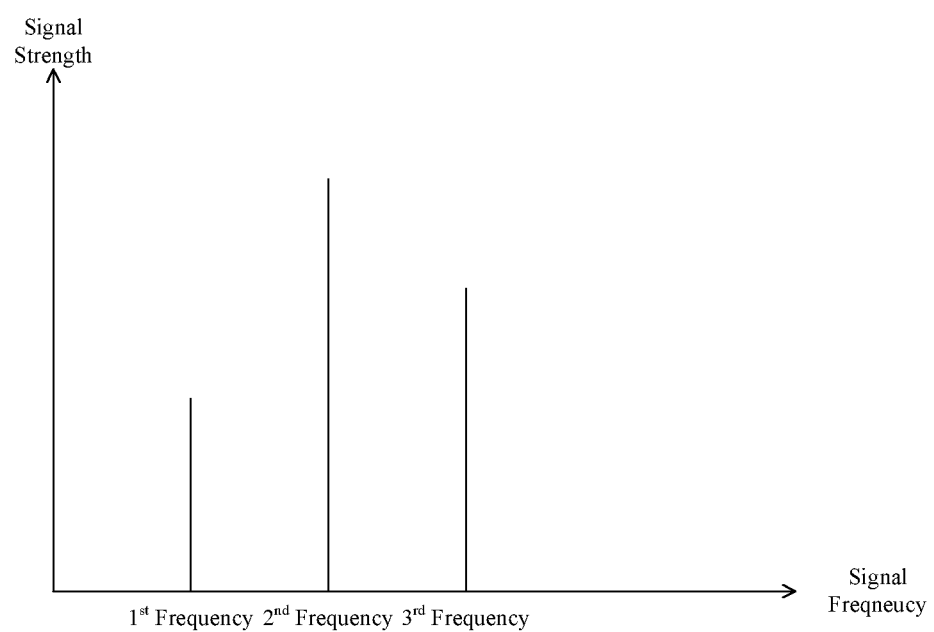
FIG. 8 is a schematic diagram depicting the result of demodulation according to the digital demodulator of FIG. 7.

Referring to FIG. 8, a schematic diagram depicting the result of demodulation according to the digital demodulator 420 of FIG. 7 is shown. The result shown in FIG. 8 is merely an illustration, in addition to being represented by a diagram; other kinds of data structure can be used to store the result of demodulation. The horizontal axis shown in FIG. 8 indicates the signal frequency, and the vertical axis thereof indicates the signal strength. The calculated result from the Fourier transformer 720 gives the signal strengths corresponding to N frequencies possibly transmitted by the transmitter 100. In an embodiment, a threshold can be set for the signal strength. Only a signal with strength greater than the threshold would be regarded as a signal having a corresponding frequency. When the signal strength of each frequency is obtained, the ratios of each two frequencies and the overall signal strength can then be calculated.

Although the embodiments of the three demodulators 420 provided in FIGS. 5 to 7 can be implemented in the touch processing device 330 shown in FIG. 3, but the present invention does not restrict that the touch processing device 330 must implement all the steps of the demodulator 420. In some embodiments, some steps of the demodulator 420 can be performed by the host 340. It should be noted that although the embodiments of the demodulators 420 can be implemented by specific hardware, but one with ordinary skills in the art can appreciate that each elements of the demodulators 420 can be implemented through software or firmware. For example, the mixers can be implemented by multiplication, and the addition integrators can be implemented by addition. Multiplication and addition are among the most common operation instructions in ordinary processors.

Figure 9A:
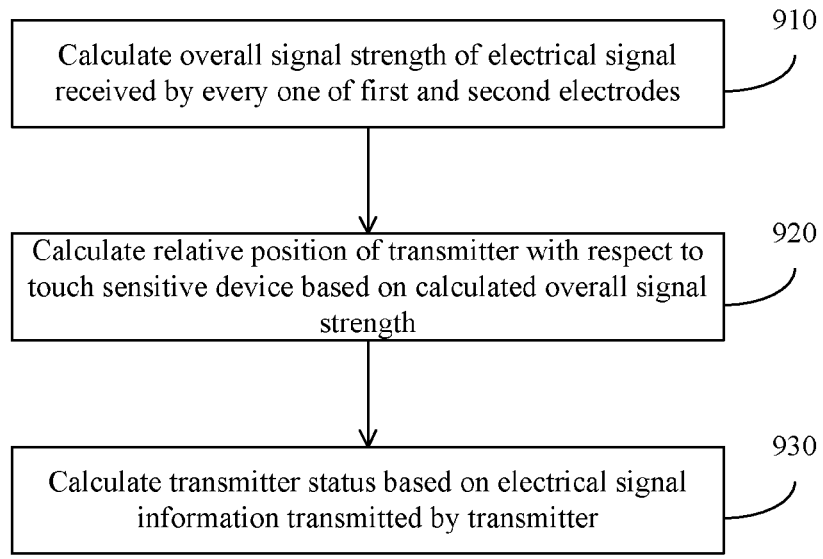
FIG. 9A is a flowchart illustrating a method for sensing a transmitter in accordance with an embodiment of the present invention.

Referring to FIG. 9A, a flowchart illustrating a method for sensing a transmitter in accordance with an embodiment of the present invention is shown. In step S910, the overall signal strength of the electrical signal received by every one of the first and second electrodes is calculated. Step 910 can be implemented using the embodiments shown in FIGS. 3 to 7. Then, in step 920, based on the calculated overall signal strength, a relative position of the transmitter with respect to a touch sensitive device is calculated. In an embodiment, the position of the transmitter is thought to be corresponding to the first and second electrodes having the largest overall signal strengths. In another embodiment, the position of the transmitter is thought to be corresponding to the centroid of adjacent first and second electrodes having the largest overall signal strengths, the magnitude of the masses of these electrodes correspond to the strength of the signals. Finally, in an optional step 930, based on information of the electrical signal transmitted by the transmitter, a transmitter status is calculated. One with ordinary skills in the art can appreciate that the implementation of step 930 can be deduced from the tables previously described.

Figure 9B:
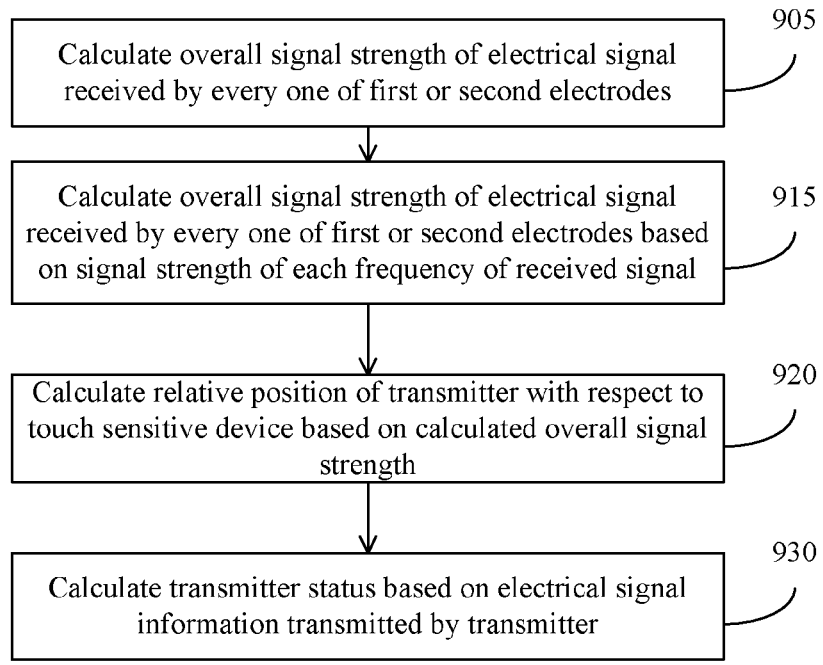
FIG. 9B is a flowchart illustrating a method for sensing a transmitter in accordance with an embodiment of the present invention.

Referring to FIG. 9B, a flowchart illustrating a method for sensing a transmitter in accordance with an embodiment of the present invention is shown. In step S905, the overall signal strength of the electrical signal received by every first or second electrode is calculated. Once the electrical signal received by a first or second electrode is demodulated, the frequencies of the signal transmitted by the transmitter can be known. For example, if the transmitter transmits a first frequency and a second frequency, but not a third frequency, then in the calculation of overall signal strengths of another electrode carried out in step 915, the calculation of the third frequency can be omitted. If the digital demodulator shown in FIG. 7 is employed, then the method shown in FIG. 9B is not required. However, if the demodulator described with respect to FIG. 5 or FIG. 6 is employed, and that the number of demodulators is not be enough to scan all frequencies in one go, then the method of FIG. 9B can save some time and calculation resources. Moreover, if after the calculations of the first electrodes or the second electrodes, no electrical signal transmitted by the transmitter is found, step 915 can be bypassed. On the contrary, if the electrical signal transmitted by the transmitter is found, then step 915 can calculate the overall signal strength of the electrical signal received by another electrode based on the signal strength of each frequency of the received electrical signal. The descriptions of the embodiment of FIG. 9A apply to the remaining steps 920 and 930.

It should be noted that in the processes of FIGS. 9A and 9B, if no cause-and-effect relationships or order between the steps are mentioned, then the present invention does not limit the order in which these steps are carried out. In addition, in steps 905, 910 and 915, the overall signal strength of the electrical signal of every first and/or second electrode(s) is mentioned. In an embodiment, if the touch sensitive system 300 includes only a single transmitter 100, the processes of FIGS. 9A and 9B will be modified to: if the overall strength of the electrical signal received by at least one first electrode and second electrode is calculated to be greater than a threshold, then execute steps 920 and 930.

In summary, one main principle of the present invention lies in that the signal strengths corresponding to a plurality of frequencies in the signal received by the first electrodes and the second electrodes are detected in order to calculate a relative position of the transmitter with respect to the touch sensitive device, and the statues of various sensors on the transmitter are further known based on the transmitter status. Moreover, the present invention can also use the touch sensitive electrodes of the capacitive touch sensitive panel to allow the same capacitive touch sensitive panel to perform capacitive sensing while carrying out the detection of the transmitter. In other words, the same capacitive touch sensitive panel can be used for the detections of fingers, palms, as well as transmitter-type styli.

In some embodiments of the present invention, when the transmitter 100 is not touching or in proximity to the touch sensitive panel 320, it may transmit an electrical signal. For example, in Table 1, when the pressure sensor at the tip of the stylus is not under any contact pressure, this means that the transmitter 100 is not touching the touch sensitive panel 320. In Sixth Transmitter Status, Seventh Transmitter Status, and Eighth Transmitter Status, at least one of the first and second buttons is pressed.

Referring now to Table 6, the transmitter statuses and their corresponding frequency mixings in accordance with an embodiment of the present invention are shown. As described before, the frequency synthesizer module 140 may synthesize three different frequencies, so each transmitter status may correspond to a different combination of the frequencies as shown in Table 6. When in Fifth Transmitter Status, the frequency synthesizer module 140 does not mix any of the frequencies. In other words, the touch processing device 330 cannot detect the suspended transmitter 100. When in Sixth Transmitter Status, Seventh Transmitter Status, and Eighth Transmitter Status, at least one of the second and third frequencies is mixed to form the electrical signal. Thus, the touch processing device 330 will be able to detect the suspended transmitter 100.

TABLE 6

| | First Frequency | Second Frequency | Third Frequency |
|---|---|---|---|
| First Transmitter Status | Mixed | Mixed | Mixed |
| Second Transmitter Status | Mixed | Mixed | Not Mixed |
| Third Transmitter Status | Mixed | Not Mixed | Not Mixed |
| Fourth Transmitter Status | Mixed | Not Mixed | Mixed |
| Seventh Transmitter Status | Not Mixed | Mixed | Mixed |
| Sixth Transmitter Status | Not Mixed | Mixed | Not Mixed |
| Fifth Transmitter Status | Not Mixed | Not Mixed | Not Mixed |
| Eighth Transmitter Status | Not Mixed | Not Mixed | Mixed |

Referring now to Table 7, the transmitter statuses and their corresponding frequency mixings in accordance with an embodiment of the present invention are shown. As described before, the frequency synthesizer module 140 may synthesize four different frequencies, so each transmitter status may correspond to a different combination of the frequencies as shown in Table 7. When in First to Fourth Transmitter Status, i.e. the transmitter 100 is touching the touch sensitive panel 320, the frequency synthesizer module 140 mixes the first frequency but not the fourth frequency. On the other hand, in Fifth to Eighth Transmitter Status, i.e. the transmitter 100 is suspended above the touch sensitive panel 320, the frequency synthesizer module 140 mixes the fourth frequency but not the first frequency. In other words, when the touch processing device 330 detects the signal corresponding to the first frequency, it indicates that the transmitter 100 is touching the touch sensitive panel 320. When the touch processing device 330 detects the signal corresponding to the fourth frequency, it indicates that the transmitter 100 is suspended above the touch sensitive panel 320.

TABLE 7

|  | First Frequency | Second Frequency | Third Frequency | Fourth Frequency |
|---|---|---|---|---|
| First Transmitter Status | Mixed | Mixed | Mixed | Not Mixed |
| Second Transmitter Status | Mixed | Mixed | Not Mixed | Not Mixed |
| Third Transmitter Status | Mixed | Not Mixed | Not Mixed | Not Mixed |
| Fourth Transmitter Status | Mixed | Not Mixed | Mixed | Not Mixed |
| Fifth Transmitter Status | Not Mixed | Mixed | Mixed | Mixed |
| Sixth Transmitter Status | Not Mixed | Mixed | Not Mixed | Mixed |
| Seventh Transmitter Status | Not Mixed | Not Mixed | Not Mixed | Mixed |
| Eighth Transmitter Status | Not Mixed | Not Mixed | Mixed | Mixed |

When the power supply module 110 included in the transmitter 100 can provide unlimited power, the transmitter 100 does not need to consider power saving, so when it is suspended or put aside, the frequency synthesizer module 140 can continuously mix the fourth frequency to allow the transmitting module 160 to continuously transmit an electrical signal.

In an embodiment, the sensor module 130 further includes an accelerometer and/or a gyroscope. When the accelerator and/or the gyroscope detects the transmitter 100 is accelerating, or when the acceleration detected by the accelerometer and/or the gyroscope is greater than a threshold, or even when another sensor, such as a button, is being pressed or released, and when the pressure sensor at the end of the stylus does not sense any contact pressure, then a period of continuous transmission of the electrical signal is set. In other words, when the accelerometer detects acceleration or when the status of a certain sensor (not the pressure sensor at the tip of the stylus) is changed, and when the transmitter 100 is at one of the fifth and eighth transmitter statuses shown in Table 6 or 7, then a period of continuous transmission of the electrical signal is set, allowing the touch processing device 330 to detect the transmitter 100 suspended above the touch sensitive panel 320.

When the transmitting module 160 continuously transmits the electrical signal, if the accelerometer detects acceleration or when the status of a certain sensor (not the pressure sensor at the tip of the stylus) is changed again, then the period of continuous transmission of the electrical signal is reset. For example, if the frequency at which the accelerometer detects acceleration is once every second, and the period of continuous transmission of the electrical signal is five seconds. Then, when acceleration is detected at $0^{th}$ second, the end of the continuous transmission period is at the $5^{th}$ second. If acceleration is detected again at the $3^{rd}$ second, then the end of the continuous transmission period is reset to be at the $8^{th}$ second.

When the transmitting module 160 continuously transmits the electrical signal, if the pressure sensor at the stylus tip detects any contact pressure, then the aforementioned continuous transmission period is cleared. Since now it can be assumed that the user is holding the transmitter 100 intentionally to perform a touch action on the touch processing device 330, so its transmission status can be changed from one of the fifth to the eighth transmission statuses in Table 6 or 7 to one of the first to the fourth transmission statuses. As such, there is no need to set the end of the continuous transmission period.

When the transmitting module 160 continuously transmits the electrical signal, and the end of the continuous transmission period is reached, then the transmitting module 160 can stop transmitting the electrical signal. In addition, other modules in the transmitter 100 may also enter into a power saving mode.

Figure 10:
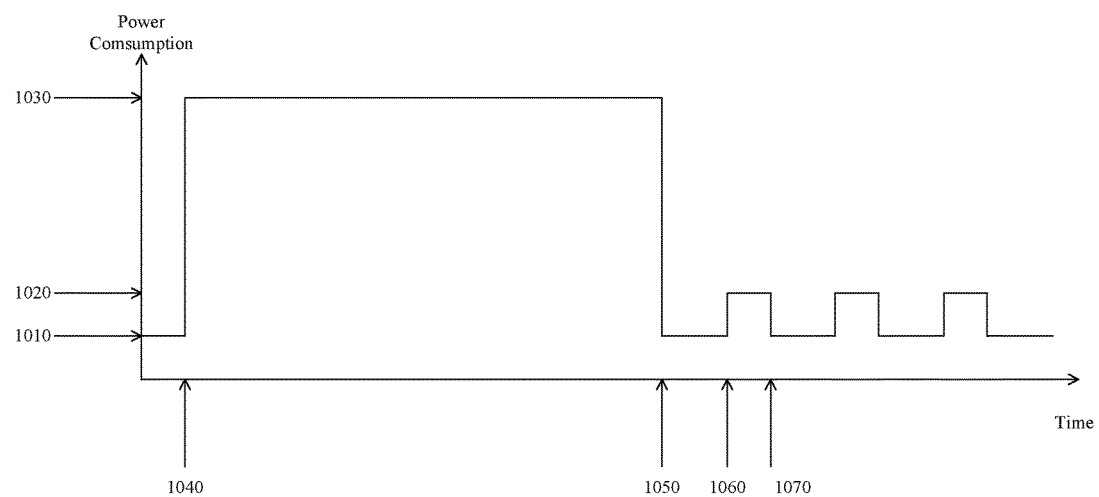
FIG. 10 is a schematic diagram illustrating the energy consumed by a transmitter in accordance with an embodiment of the present invention.

Referring now to FIG. 10, a schematic diagram illustrating the energy consumed by a transmitter in accordance with an embodiment of the present invention is shown. The horizontal axis indicates time, while the vertical axis indicates the amount of energy consumed by the transmitter. Before time point 1040, the level of energy consumed by the transmitter is first energy consumption 1010. In an embodiment, the first energy consumption 1010 is only enough for the operation of a timer or a clock oscillator. At time point 1040, the accelerometer described before detects acceleration or when the status of a certain sensor (not the pressure sensor at the tip of the stylus) is changed, but the pressure sensor does not detect any pressure, the transmitter is in one of the fifth to the eighth transmitter status shown in Table 6 or 7, so the transmitter sets a period of continuous electrical signal transmission. Thus, after time point 1040, since the transmitter is transmitting the electrical signal, so all of the modules shown in FIG. 1 are turned on, and the level of energy consumed is raised to third energy consumption 1030.

Time point 1050 is the end of this continuous transmission period, so when the transmitter has stopped transmitting the electrical signal, and turned off most of the modules, the energy consumed returns back to the first energy consumption 1010. However, the timer supported by the first energy consumption 1010 will, after a period of time, such as at time point 1060, wake up the accelerometer or other sensors. The sensor module 130 of the transmitter will perform a scan on the statuses of these sensors to confirm if any changes in the statues. During the scanning of the sensors' statuses, the energy consumed by the transmitter is second energy consumption 1020. Although the second energy consumption 1020 is higher than the first energy consumption 1010, but is lower than the third energy consumption. Thereafter at time point 1070, the sensor module 130 of the transmitter confirms that there is no change in the sensors' statuses, so the sensor module 130 of the transmitter is turned off, and the energy consumed by the transmitter is back to the first energy consumption 1010 again.

In the previous embodiment, although the method of scanning the accelerometer or other sensors is used, but the transmitter 100 still cannot be certain that it is in proximity to the touch processing device 330. As such, the energy used for sending out the electrical signal by the transmitter 100 may be wasted. For example, if the user is merely fiddling with the transmitter 100 without being close to the touch sensitive panel, the electrical signal will not be received by the touch sensitive panel. Therefore, in another embodiment, the sensor module 130 of the transmitter 100 further includes an electrical signal detecting module for detecting certain electrical signals of the touch sensitive panel 320.

Figure 11:
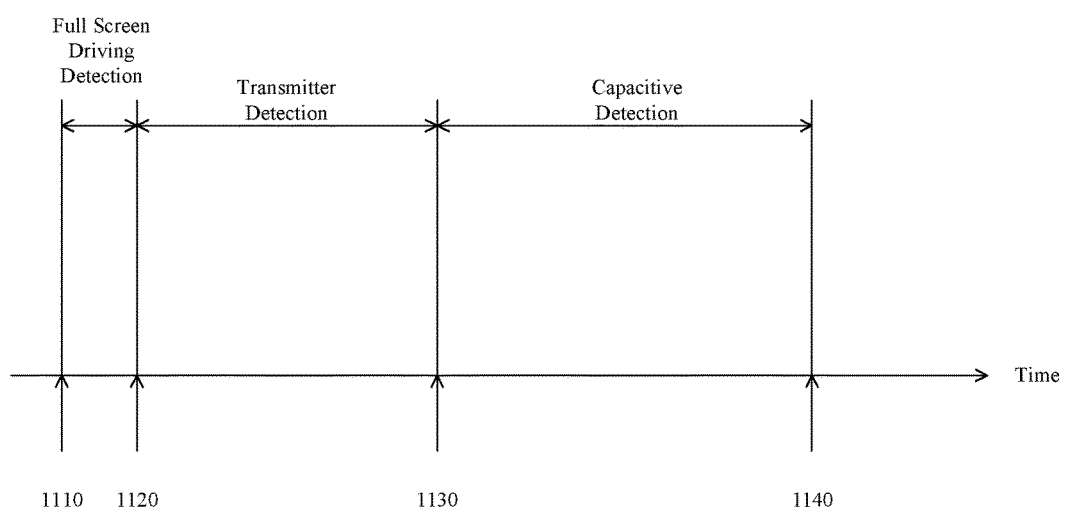
FIG. 11 is a schematic diagram illustrating detection periods of a touch processing device in accordance with an embodiment of the present invention.

Referring now to FIG. 11, a schematic diagram illustrating detection periods of a touch processing device in accordance with an embodiment of the present invention is shown. At time point 1110, the touch processing device 330 may perform a full-screen driving detection on the touch sensitive panel 320 to determine if there is any conductive object, such as a water mark, on the touch sensitive panel 320. During full-screen driving detection, all of the first electrodes 321 and the second electrodes 322 are connected with a driving voltage and transmit electrical signals at a certain full-screen driving frequency. Thus, when the above electrical signal detecting module detects the electrical signal corresponding to the full-screen driving frequency, the transmitter 100 knows that it is close to the touch sensitive panel 320. After it is determined that the touch sensitive panel 320 is transmitting an electrical signal corresponding to the full-screen driving frequency, the transmitter 100 can continuously sending out an electrical signal for a period of time. At time point 1120, the touch processing device 330 has completed full-screen driving detection and begins to perform the transmitter detection. For example, the method described in the embodiment with respect to FIG. 9A or 9B is used to actively detect a transmitter that is sending out an electrical signal for a period of time. At time point 1130, the touch processing device 330 has finished the detection of the transmitter 100, and begins to perform capacitive detection to find any external conductive objects that do not actively send out electrical signals. At time point 1140, the touch processing device 330 has finished capacitive detection and begins to perform full-screen driving detection again.

In an embodiment, the full-screen driving detection can use several full-screen driving frequencies to prevent external signal interference. Thus, the above electrical signal detecting module can detect electrical signals corresponding to several full-screen driving frequencies. In another embodiment, the number of full-screen driving detections does not correspond to the number of transmitter detections or capacitive detections. However, the transmitter 100 may know in advance the algorithm of the touch processing device 330, and the period for which the transmitter 100 transmits the electrical signal can be equal to or longer than the total time of two full-screen driving detections.

Moreover, the transmitter 100 may target a special activation signal of non full-screen driving frequency. For example, the touch processing device 330 may instruct all of the first electrodes 321 or second electrodes 322 to transmit the special activation signal after the execution(s) of every or several capacitive detection(s). In another embodiment, in order to save the power of the touch sensitive panel, the touch processing device 330 may instruct some of the first electrodes 321 or second electrodes 322 to transmit the special activation signal. For example, two of every three first electrodes 321 are to transmit the special activation signal, or four of every five first electrodes 321 are to transmit the special activation signal. Similarly, the period for which the transmitter 100 transmits the electrical signal can be equal to or longer than the total time of two special signal activations.

The present invention does not limit the implementations of the frequencies, order, ratios and etc. of the transmitter detection, the capacitive detection and the full-screen driving detection of the touch processing device 330. The present invention only delineates that the transmitter 100 transmits an electrical signal for a period of time once the electrical signal detecting module detects a certain electrical signal of the touch sensitive panel 320.

In an embodiment, the transmitting module 160 of the transmitter 100 can be an array of antennas or a conductor or electrode with appropriate impedance, or it can be called an excitation electrode. The electrical signal detecting module can also include an electrical signal detecting electrode, fully or partially surrounding the excitation electrode and insulated from the excitation electrode. The electrical signal detecting module can be coupled to at least one demodulator shown in FIGS. 5 to 7 to detect the full-screen detecting signal or the special activation signal described above. When there are several full-screen detecting signals or the special activation signals, the electrical signal detecting module may include a plurality of demodulators, each for detecting one of the several full-screen detecting signals or the special activation signals. When the signal strength detected by at least one demodulator is greater than a threshold, the transmitter 100 is notified to start transmitting the electrical signal.

It should be noted that since the electrical signal detecting electrode is at least partially surrounding the excitation electrode, so when the transmitter 100 transmits the electrical signal via the excitation electrode, this electrical signal consisting of a mixture of signals of numerous frequencies may potentially interfere with the electrical signal detecting module. Therefore, as for the system design, the frequencies mixed within the frequency synthesizer module 140 of the transmitter 100 are different or not mutually resonant with the several full-screen driving frequencies or special activation frequencies described earlier.

Returning now to FIG. 10, this diagram is applicable to a transmitter 100 including an electrical signal detecting module. When at time point 1040, the electrical signal detecting module is waken up, and it detects a certain electrical signal transmitted from the touch sensitive panel 320. Therefore, the transmitter 100 transmits an electrical signal for a period of time, and the overall energy consumption is raised from first energy consumption 1010 to third energy consumption 1030. Next, when at time point 1050, the electrical signal detecting module did not detect the certain electrical signal transmitted by the touch sensitive panel 320 for a period of time, so the transmitter 100 stops transmitting the electrical signal, and allows each module or circuit to go into power saving mode except for a timer and/or an oscillator. The overall energy consumption is reduced from the third energy consumption 1030 to the first energy consumption 1010.

Next, at time point 1060, the timer wakes up the electrical signal detecting module to see if the touch sensitive panel 320 is transmitting the certain electrical signal, so the overall energy consumption is raised from the first energy consumption 1010 to second energy consumption 1020, but unnecessary modules or circuits are still in the power saving mode. At time point 1070, the electrical signal detecting module does not detect the certain electrical signal and thus reverts back to the power saving mode, and the overall energy consumption is reduced from the second energy consumption 1020 to the first energy consumption 1010.

In an embodiment, the present invention provides a transmitter for transmitting an electrical signal to a touch sensitive device according to a transmitter status in response to a trigger event detected. As a result, the touch sensitive device can analyze the electrical signal in order to obtain the transmitter status and a relative position between the transmitter and the touch sensitive device. The electrical signal is mixed by signals having a plurality of frequencies.

The transmitter may further include a processing module and a sensor module. The sensor module further includes an accelerometer or a gyroscope. The trigger event is triggered when the accelerometer or the gyroscope detects an acceleration that is greater than a threshold. The processing module is used for generating the transmitter status according to the status in the sensor module. The sensor module further includes a pressure sensor. When the pressure sensor has not sensed any pressure for a period of time since the trigger event is detected, the transmitter then stops transmitting the electrical signal.

In an embodiment, when the pressure sensor senses a pressure in said period of time, the processing module generates a new transmitter status and transmits an electrical signal according to the new transmitter status. In another embodiment, when the status of a sensor included in the sensor module has changed in said period of time, the processing module generates a new transmitter status and transmits an electrical signal according to the new transmitter status. In yet another embodiment, the trigger event is detected again in said period of time, and the end of said period is reset. In some embodiments, during the sleep period in which the transmitter stops transmitting the electrical signal, the transmitter is in a power saving mode. After the sleep period, the accelerometer or the gyroscope is activated to detect any acceleration while the rest of the transmitter is still in the power saving mode.

The transmitter may further include a processing module and a sensor module. The sensor module further includes an electrical signal detecting module. The trigger event is triggered when the electrical signal detecting module detects an activation electrical signal corresponding to an activation frequency. The processing module is used for generating the transmitter status according to the status in the sensor module.

The activation electrical signal is sent by the touch sensitive device. The electrical signal detecting module can detect the activation signal only when the transmitter is in proximity or touching the touch sensitive device. In an embodiment, the activation frequency corresponds to a working frequency when the touch sensitive device is carrying out a full-screen driving detection. The activation frequency is different from and not mutually resonant with the plurality of frequencies. The activation frequency is different from and not mutually resonant with the frequency transmitted by the touch sensitive device when it is carrying out a capacitive detection.

When a period of time has elapsed since the trigger event is detected, the transmitter stops transmitting the electrical signal. In an embodiment, the activation signal is transmitted by the touch sensitive device, and the total time it takes for the touch sensitive device to transmit two activation signals is less than or equal to said period of time. In another embodiment, when the pressure sensor senses a pressure in said period of time, the processing module generates a new transmitter status and transmits an electrical signal according to the new transmitter status. In another embodiment, when the status of a sensor included in the sensor module has changed in said period of time, the processing module generates a new transmitter status and transmits an electrical signal according to the new transmitter status. In yet another embodiment, the trigger event is detected again in said period of time, and the end of said period is reset. In some embodiments, during the sleep period in which the transmitter stops transmitting the electrical signal, the transmitter is in a power saving mode. After the sleep period, the electrical signal detecting module performs detection of the activation electrical signal while the rest of the transmitter is still in the power saving mode.

The above electrical signal detecting module further includes at least a demodulator for detecting the activation electrical signal. The demodulator includes: a signal generator for generating an in-phase signal and an orthogonal signal, wherein the frequency of the in-phase signal and the orthogonal signal is the activation frequency; at least a mixer for mixing the in-phase signal with a received signal to generate an in-phase analog signal, and mixing the orthogonal signal with the received signal to generate an orthogonal analog signal; at least an integrator for performing integration on the in-phase analog signal to generate an in-phase integration signal, and performing integration on the orthogonal analog signal to generate an orthogonal integration signal; at least a squarer for calculating the square of the in-phase integration signal and the square of the orthogonal integration signal; and at least one "Root Mean Square (RMS) of Sum" element for calculating the root mean square of the sum of the square of the in-phase integration signal and the square of the orthogonal integration signal to obtain a signal strength corresponding to the activation frequency.

The above electrical signal detecting module further includes at least a demodulator for detecting the activation electrical signal. The demodulator includes: an ADC for converting a received signal from analog to digital form to produce a digital received signal; a signal generator for generating an in-phase signal and an orthogonal signal, wherein the frequency of the in-phase signal and the orthogonal signal is the activation frequency; at least a mixer for mixing the in-phase signal with a received signal to generate an in-phase analog signal, and mixing the orthogonal signal with the received signal to generate an orthogonal analog signal; at least an addition integrator for performing addition integration on the in-phase analog signal to generate an in-phase integration signal, and performing addition integration on the orthogonal analog signal to generate an orthogonal integration signal; at least a squarer for calculating the square of the in-phase integration signal and the square of the orthogonal integration signal; and a "Root Mean Square (RMS) of Sum" element for calculating the root mean square of the sum of the square of the in-phase integration signal and the square of the orthogonal integration signal to obtain a signal strength corresponding to the activation frequency.

The above electrical signal detecting module further includes at least a demodulator for detecting the activation electrical signal. The demodulator includes: an ADC for converting a received signal from analog to digital form to produce a digital received signal; and a Fourier transformer for performing Fourier transform on the digital received signal to generate a signal strength corresponding to the activation frequency. The transmitter may further include an excitation electrode for transmitting the electrical signal, wherein the electrical signal detecting module may further include an electrical signal detecting electrode fully or partially surrounding and insulated from the excitation signal.

Figure 12:
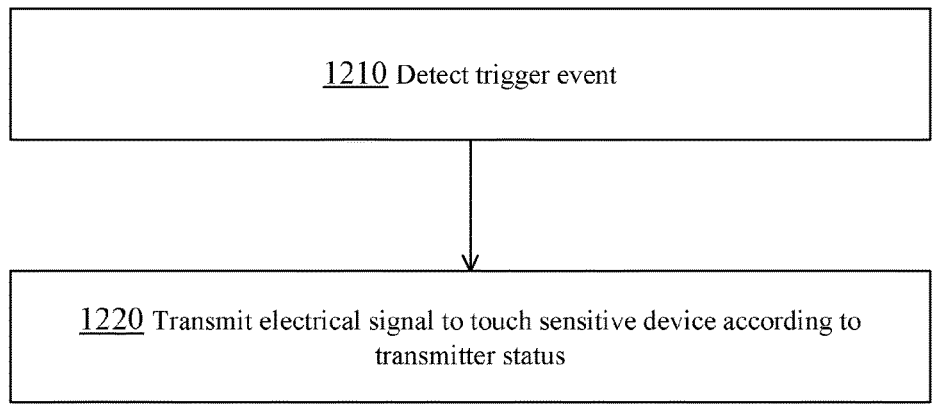
FIG. 12 is a flowchart illustrating a transmitting method in accordance with the present invention.

Referring now to FIG. 12, a flowchart illustrating a transmitting method in accordance with the present invention is shown. The transmitting method is applicable to a transmitter and includes the following steps. In step 1210, a trigger event is detected. In step 1220, an electrical signal is transmitted to a capacitive touch sensitive device according to a transmitter status in response to the trigger event detected, allowing the capacitive touch sensitive device to analyze the electrical signal in order to obtain the transmitter status and a relative position between the transmitter and the capacitive touch sensitive device, wherein the electrical signal is mixed by signals having a plurality of frequencies.

The above trigger event is triggered when an acceleration greater than a threshold is detected. The transmitting method further includes generating the transmitter status according to a status within a sensor module of the transmitter. The sensor module further includes a pressure sensor. The transmitting method further includes: when a period of time has elapsed since the trigger event is detected and the pressure sensor did not sense any pressure during this period of time, stopping the transmission of the electrical signal. In an embodiment, when the pressure sensor senses a pressure in said period of time, a new transmitter status is generated and an electrical signal according to the new transmitter status is transmitted. In another embodiment, when the status of a sensor included in the sensor module has changed in said period of time, a new transmitter status is generated and an electrical signal according to the new transmitter status is transmitted. In yet another embodiment, when the trigger event is detected again in said period of time, the end of said period is reset. In some embodiments, during a sleep period in which the transmitter stops transmitting the electrical signal, the transmitter is in a power saving mode. After the sleep period, acceleration detection is activated while the rest of the transmitter is still in the power saving mode.

The sensor module of the transmitter further includes an electrical signal detecting module. The trigger event is triggered when the electrical signal detecting module detects an activation electrical signal corresponding to an activation frequency. The transmitting method further includes generating the transmitter status according to a status within the sensor module. The activation electrical signal is sent by the capacitive touch sensitive device. The electrical signal detecting module can detect the activation signal only when the transmitter is in proximity or touching the capacitive touch sensitive device. The activation frequency corresponds to a working frequency when the capacitive touch sensitive device is carrying out a full-screen driving detection. The activation frequency is different from and not mutually resonant with the plurality of frequencies. The activation frequency is different from and not mutually resonant with the frequency transmitted by the capacitive touch sensitive device when it is carrying out a capacitive detection.

When a period of time has elapsed since the trigger event is detected, the transmitter stops transmitting the electrical signal. The activation signal is transmitted by the capacitive touch sensitive device, and the total time it takes for the capacitive touch sensitive device to transmit two activation signals is less than or equal to said period of time. In an embodiment, when the status of a sensor included in the sensor module has changed in said period of time, a new transmitter status is generated and an electrical signal according to the new transmitter status is transmitted. In another embodiment, during a sleep period in which the transmitter stops transmitting the electrical signal, the transmitter is in a power saving mode. After the sleep period, acceleration detection is activated while the rest of the transmitter is still in the power saving mode.

In an embodiment, the above electrical signal detecting module further includes performing the following steps of: mixing an in-phase signal with a received signal to generate an in-phase analog signal, and mixing an orthogonal signal with the received signal to generate an orthogonal analog signal, wherein the frequency of the in-phase signal and the orthogonal signal is the activation frequency; performing integration on the in-phase analog signal to generate an in-phase integration signal, and performing integration on the orthogonal analog signal to generate an orthogonal integration signal; and calculating the root mean square of the sum of the square of the in-phase integration signal and the square of the orthogonal integration signal to obtain a signal strength corresponding to the activation frequency.

In another embodiment, the above electrical signal detecting module further includes performing the following steps of: performing analog-to-digital conversion on a received signal to produce a digital received signal; mixing an in-phase signal with a received signal to generate an in-phase analog signal, and mixing an orthogonal signal with the received signal to generate an orthogonal analog signal, wherein the frequency of the in-phase signal and the orthogonal signal is the activation frequency; performing addition integration on the in-phase analog signal to generate an in-phase integration signal, and performing addition integration on the orthogonal analog signal to generate an orthogonal integration signal; and calculating the root mean square of the sum of the square of the in-phase integration signal and the square of the orthogonal integration signal to obtain a signal strength corresponding to the activation frequency.

In another embodiment, the above electrical signal detecting module further includes performing the following steps of: performing analog-to-digital conversion on a received signal to produce a digital received signal; and performing Fourier transform on the digital received signal to generate a signal strength corresponding to the activation frequency.

The above transmitter may further include an excitation electrode for transmitting the electrical signal, wherein the electrical signal detecting module may further include an electrical signal detecting electrode fully or partially surrounding and insulated from the excitation signal.

Figure 13:
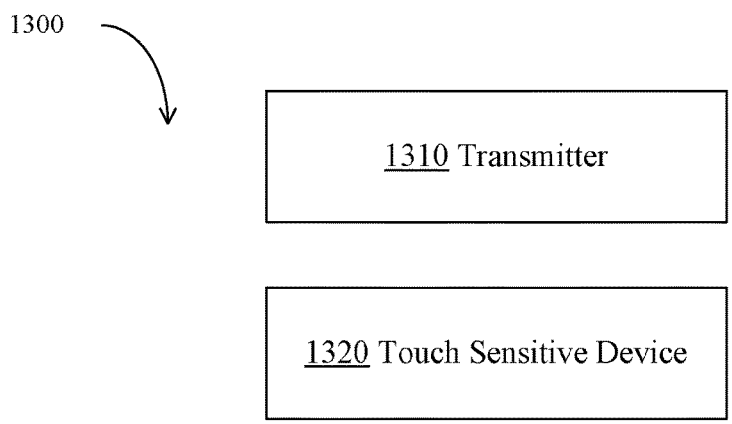
FIG. 13 is a block diagram illustrating a touch sensitive system in accordance with the present invention.

Referring to FIG. 13, a block diagram illustrating a touch sensitive system 1300 in accordance with the present invention is shown. The touch sensitive system 1300 includes at least a transmitter 1310 and a capacitive touch sensitive device 1320. The transmitter 1310 is used to transmit an electrical signal to according to a transmitter status in response to a trigger event detected, wherein the electrical signal is mixed by signals having a plurality of frequencies. The capacitive touch sensitive device 1320 is used to analyze the electrical signal in order to obtain the transmitter status and a relative position between the transmitter and the capacitive touch sensitive device.

In an embodiment of the present invention, a touch processing device connected to a touch sensitive panel is provided. The touch sensitive panel includes a plurality of first electrodes and a plurality of second electrodes, wherein a plurality of sensing points are formed at intersections of the first and second electrodes. The touch processing device is used for allowing at least some of the plurality of first electrodes to transmit an activation signal at an activation frequency in a first period, wherein the activation signal enables a transmitter to transmit an electrical signal, and for allowing the plurality of first and second electrodes to receive the electrical signal in a second period, so as to analyze the electrical signal to obtain a transmitter status of the transmitter and a relative position between the transmitter and the touch sensitive panel.

In an embodiment, the above touch processing device is further used for performing a full-screen driving detection using the activation signal. In another embodiment, the above first period is followed by the above second period. In still another embodiment, the above first period is immediately followed by the above second period. In some embodiments, the above touch processing device is further used for performing capacitive detection in a third period using the plurality of first and second electrodes, wherein the second period is followed by the third period. The above touch processing device can be used for performing capacitive detection.

Figure 14:
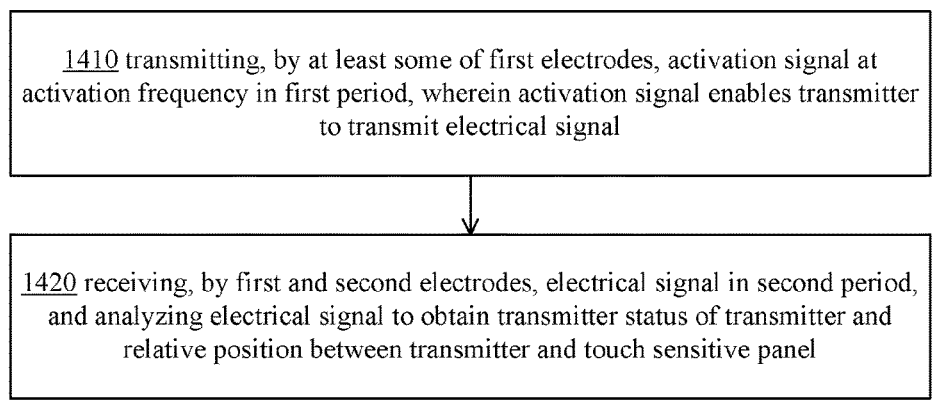
FIG. 14 is a flowchart illustrating a touch processing method in accordance with an embodiment of the present invention.

Referring now to FIG. 14, a flowchart illustrating a touch processing method in accordance with an embodiment of the present invention is shown. The touch processing method is applicable to a touch processing device connected to a touch sensitive panel. The touch sensitive panel includes a plurality of first electrodes and a plurality of second electrodes, wherein a plurality of sensing points are formed at intersections of the first and second electrodes. The touch processing method includes the following steps.

In step 1410, at least some of the plurality of first electrodes is allowed to transmit an activation signal at an activation frequency in a first period, wherein the activation signal enables a transmitter to transmit an electrical signal. In step 1420, the plurality of first and second electrodes are allowed to receive the electrical signal in a second period, so as to analyze the electrical signal to obtain a transmitter status of the transmitter and a relative position between the transmitter and the touch sensitive panel.

In an embodiment, the above touch processing method further includes performing a full-screen driving detection using the activation signal. In another embodiment, the above first period is followed by the above second period. In still another embodiment, the above first period is immediately followed by the above second period. In some embodiments, the above touch processing method further includes performing capacitive detection in a third period using the plurality of first and second electrodes, wherein the second period is followed by the third period. The above touch processing method can further include capacitive detection.

What is claimed is:

1. A transmitter for transmitting an electrical signal to a capacitive touch sensitive device according to a transmitter status in response to a trigger event detected, allowing the capacitive touch sensitive device to analyze the electrical signal in order to obtain the transmitter status and a relative position between the transmitter and the capacitive touch sensitive device, wherein the electrical signal is mixed by signals having a plurality of frequencies, wherein the transmitter comprises a processing module and a sensor module, the sensor module further including an electrical signal detecting module, wherein the trigger event is triggered when the electrical signal detecting module detects an activation electrical signal corresponding to an activation frequency, wherein the processing module is used for generating the transmitter status according to a status within the sensor module, wherein when the trigger event is detected the transmitter begins transmitting the electrical signal, and when a period of time has elapsed since the trigger event is detected, the transmitter stops transmitting the electrical signal, wherein the electrical signal detecting module further includes at least one of a first demodulator, a second demodulator and a third demodulator for detecting the activation electrical signal, wherein the first demodulator includes:

a signal generator for generating an in-phase signal and an orthogonal signal, wherein the frequency of the in-phase signal and the orthogonal signal is the activation frequency;

at least a mixer for mixing the in-phase signal with a received signal to generate an in-phase analog signal, and mixing the orthogonal signal with the received signal to generate an orthogonal analog signal;

at least an integrator for performing integration on the in-phase analog signal to generate an in-phase integration signal, and performing integration on the orthogonal analog signal to generate an orthogonal integration signal;

at least a squarer for calculating the square of the in-phase integration signal and the square of the orthogonal integration signal; and at least one "Root Mean Square (RMS) of Sum" element for calculating the root mean square of the sum of the square of the in-phase integration signal and the square of the orthogonal integration signal to obtain a signal strength corresponding to the activation frequency, and wherein the second demodulator includes:

an analog-to-digital converter (ADC) for performing analog-to-digital conversion on a received signal to produce a digital received signal;

a signal generator for generating an in-phase signal and an orthogonal signal, wherein the frequency of the in-phase signal and the orthogonal signal is the activation frequency;

at least a mixer for mixing the in-phase signal with a received signal to generate an in-phase analog signal, and mixing the orthogonal signal with the received signal to generate an orthogonal analog signal;

at least an addition integrator for performing addition integration on the in-phase analog signal to generate an in-phase integration signal, and performing addition integration on the orthogonal analog signal to generate an orthogonal integration signal;

at least a squarer for calculating the square of the in-phase integration signal and the square of the orthogonal integration signal; and a "Root Mean Square (RMS) of Sum" element for calculating the root mean square of the sum of the square of the in-phase integration signal and the square of the orthogonal integration signal to obtain a signal strength corresponding to the activation frequency, wherein the third demodulator includes:

an analog-to-digital converter (ADC) for performing analog-to-digital conversion on a received signal to produce a digital received signal; and a Fourier transformer for performing Fourier transform on the digital received signal to generate a signal strength corresponding to the activation frequency.

2. The transmitter of claim 1, wherein the activation electrical signal is sent by the capacitive touch sensitive device, and the electrical signal detecting module detects the activation signal only when the transmitter is in proximity or touching the capacitive touch sensitive device.

3. The transmitter of claim 2, wherein the activation frequency corresponds to a working frequency when the capacitive touch sensitive device is carrying out a full-screen driving detection.

4. The transmitter of claim 2, wherein the activation frequency is different from and not mutually resonant with the plurality of frequencies.

5. The transmitter of claim 2, wherein the activation frequency is different from and not mutually resonant with the frequency transmitted by the capacitive touch sensitive device when it is carrying out a capacitive detection.

6. The transmitter of claim 1, wherein the activation signal is transmitted by the capacitive touch sensitive device, and the total time it takes for the capacitive touch sensitive device to transmit two activation signals is less than or equal to the period of time.

7. The transmitter of claim 1, wherein when the pressure sensor senses a pressure in the period of time, the processing module generates a new transmitter status and transmits an electrical signal according to the new transmitter status.

8. The transmitter of claim 1, wherein during a sleep period in which the transmitter stops transmitting the electrical signal, the transmitter is in a power saving mode, and after the sleep period, the electrical signal detecting module performs the detection of the activation electrical signal while the rest of the transmitter is still in the power saving mode.

9. The transmitter of claim 1, further comprising an excitation electrode for transmitting the electrical signal, wherein the electrical signal detecting module further includes an electrical signal detecting electrode fully or partially surrounding and insulated from the excitation signal.

10. A transmitting method applicable to a transmitter, wherein a sensor module of the transmitter further includes an electrical signal detecting module, the transmitting method comprising:
    detecting a trigger event, wherein the trigger event is triggered when the electrical signal detecting module detects an activation electrical signal corresponding to an activation frequency;
    generating a transmitter status according to a status within the sensor module; and
    transmitting an electrical signal to a capacitive touch sensitive device according to the transmitter status in response to the trigger event detected, allowing the capacitive touch sensitive device to analyze the electrical signal in order to obtain the transmitter status and a relative position between the transmitter and the capacitive touch sensitive device, wherein the electrical signal is mixed by signals having a plurality of frequencies;
    stopping the transmission of the electrical signal, when a period of time has elapsed since the trigger event is detected,
    wherein the electrical signal detecting module further includes performing one of a first set of steps, a second set of steps and a third set of steps, the first set of steps including:
        mixing an in-phase signal with a received signal to generate an in-phase analog signal;
        mixing an orthogonal signal with the received signal to generate an orthogonal analog signal, wherein the frequency of the in-phase signal and the orthogonal signal is the activation frequency;
        performing integration on the in-phase analog signal to generate an in-phase integration signal;
        performing integration on the orthogonal analog signal to generate an orthogonal integration signal; and
        calculating the root mean square of the sum of the square of the in-phase integration signal and the square of the orthogonal integration signal to obtain a signal strength corresponding to the activation frequency, wherein the second set of steps including:
        performing analog-to-digital conversion on a received signal to produce a digital received signal;
        mixing an in-phase signal with a received signal to generate an in-phase analog signal;
        mixing an orthogonal signal with the received signal to generate an orthogonal analog signal, wherein the frequency of the in-phase signal and the orthogonal signal is the activation frequency;
        performing addition integration on the in-phase analog signal to generate an in-phase integration signal;
        performing addition integration on the orthogonal analog signal to generate an orthogonal integration signal; and
        calculating the root mean square of the sum of the square of the in-phase integration signal and the square of the orthogonal integration signal to obtain a signal strength corresponding to the activation frequency, and the third set of steps including:
        performing analog-to-digital conversion on a received signal to produce a digital received signal; and
        performing Fourier transform on the digital received signal to generate a signal strength corresponding to the activation frequency.

11. The transmitting method of claim 10, wherein the activation electrical signal is sent by the capacitive touch sensitive device, and the electrical signal detecting module detects the activation signal only when the transmitter is in proximity or touching the capacitive touch sensitive device.

12. The transmitting method of claim 11, wherein the activation frequency corresponds to a working frequency when the capacitive touch sensitive device is carrying out a full-screen driving detection.

13. The transmitting method of claim 11, wherein the activation frequency is different from and not mutually resonant with the plurality of frequencies.

14. The transmitting method of claim 11, wherein the activation frequency is different from and not mutually resonant with the frequency transmitted by the capacitive touch sensitive device when it is carrying out a capacitive detection.

15. The transmitting method of claim 10, wherein the activation signal is transmitted by the capacitive touch sensitive device, and the total time it takes for the capacitive touch sensitive device to transmit two activation signals is less than or equal to said period of time.

16. The transmitting method of claim 10, further comprising, when the status of a sensor included in the sensor module has changed in said period of time, generating a new transmitter status and transmitting an electrical signal according to the new transmitter status.

17. The transmitting method of claim 10, further comprising, during a sleep period in which the transmitter stops transmitting the electrical signal, the transmitter being in a power saving mode, and after the sleep period, activating acceleration detection while the rest of the transmitter is still in the power saving mode.

18. The transmitting method of claim 10, wherein the transmitter further includes an excitation electrode for transmitting the electrical signal, wherein the electrical signal detecting module further includes an electrical signal detecting electrode fully or partially surrounding and insulated from the excitation signal.

19. A touch processing device connected to a touch sensitive panel, comprising a plurality of first electrodes and a plurality of second electrodes, wherein a plurality of sensing points are formed at intersections of the first and second electrodes, wherein the touch processing device is used for allowing at least some of the plurality of first electrodes to transmit an activation signal at an activation frequency in a first period, wherein the activation signal enables a transmitter to transmit an electrical signal, and for allowing the plurality of first and second electrodes to receive the electrical signal in a second period, so as to analyze the electrical signal to obtain a transmitter status of the transmitter and a relative position between the transmitter and the touch sensitive panel, wherein the touch processing device is further used for performing a full-screen driving detection using the activation signal, wherein said full-screen driving detection comprises connecting said plurality of first electrodes and said plurality of second electrodes with a driving voltage.

20. The touch processing device of claim 19, wherein the first period is followed by the second period.

21. The touch processing device of claim 20, wherein the first period is immediately followed by the second period.

22. The touch processing device of claim 19, wherein the touch processing device is further used for performing capacitive detection in a third period using the plurality of first and second electrodes.

23. The touch processing device of claim 22, wherein the second period is followed by the third period.

24. The touch processing device of claim 19, wherein the touch processing device is further used for performing capacitive detection.

25. A touch processing method applicable to a touch processing device connected to a touch sensitive panel, wherein the touch sensitive panel includes a plurality of first electrodes and a plurality of second electrodes, wherein a plurality of sensing points are formed at intersections of the first and second electrodes, and the touch processing method comprising the following steps of:
    transmitting, by the plurality of first electrodes, an activation signal at an activation frequency in a first period, wherein the activation signal enables a transmitter to transmit an electrical signal;
    performing a full-screen driving detection using the activation signal, wherein said full-screen driving detection comprises connecting said plurality of first electrodes and said plurality of second electrodes with a driving voltage; and
    receiving, by the plurality of first and second electrodes, the electrical signal in a second period, so as to analyze the electrical signal to obtain a transmitter status of the transmitter and a relative position between the transmitter and the touch sensitive panel.

26. The touch processing method of claim 25, wherein the first period is followed by the second period.

27. The touch processing method of claim 26, wherein the first period is immediately followed by the second period.

28. The touch processing method of claim 25, further comprising performing capacitive detection in a third period using the plurality of first and second electrodes.

29. The touch processing method of claim 28, wherein the second period is followed by the third period.

30. The touch processing method of claim 25, further comprising performing capacitive detection.

\* \* \* \* \*